(12) United States Patent
Bear et al.

(10) Patent No.: US 8,130,656 B2
(45) Date of Patent: Mar. 6, 2012

(54) METHOD AND DEVICE FOR ROUTING MESH NETWORK TRAFFIC

(75) Inventors: Christopher L. Bear, Marietta, GA (US); Keith J. Goldberg, Casselberry, FL (US)

(73) Assignee: Motorola Solutions, Inc., Schaumburg, IL (US)

( * ) Notice: Subject to any disclaimer, the term of this patent is extended or adjusted under 35 U.S.C. 154(b) by 751 days.

(21) Appl. No.: 11/835,024

(22) Filed: Aug. 7, 2007

(65) Prior Publication Data

US 2009/0041039 A1   Feb. 12, 2009

(51) Int. Cl.
*H04J 1/16* (2006.01)
(52) U.S. Cl. .................. 370/237; 370/229; 370/235
(58) Field of Classification Search ........... 370/229–240
See application file for complete search history.

(56) References Cited

U.S. PATENT DOCUMENTS 5,425,019 A * 6/1995 Chugo et al. ............... 370/237
(Continued)

FOREIGN PATENT DOCUMENTS

WO    2005029881 A2    3/2005

OTHER PUBLICATIONS

Dynamic Backbone Subnets—DBS/802.11—Access Point-to-Access Point Routing for 802.11 Infrastructure Networks—Hauser et al—U.S. Naval Research Lab—Oct. 2002—Extracted from: http://www.ieee802.org/meeting/meeting_files/DBS%20AP-Ap%20Routing.pdf#search=%22manet%20backbone%22.
Introduction to MANET Routing—Laura Marie Feeney, Swedish Institute of Computer Science Extracted from: http://www.nada.kth.se/kurser/kth/2D1490/05/lectures/feeney_mobile_adhoc_routing.pdf#search=%22manet%20backbone%22.

(Continued)

*Primary Examiner* — Hassan Kizou
*Assistant Examiner* — Ashil Farahmand
(74) *Attorney, Agent, or Firm* — Randi L. Karpinia

(57) ABSTRACT

A method and device for routing to a non-mesh network a first data flow received at a first mesh gateway via a wireless link as provided improves network efficiency. According to one aspect, the method includes determining that available bandwidth of a backhaul link to the non-mesh network through the first mesh gateway is below a threshold value. The first data flow is then determined to have a higher priority than a second data flow that is currently routed through the first mesh gateway to the non-mesh network. The second data flow is then forwarded to a second mesh gateway, whereby the second mesh gateway routes the second data flow to the non-mesh network. The first data flow is then routed to the non-mesh network through the first mesh gateway after forwarding the second data flow to the second mesh gateway.

15 Claims, 4 Drawing Sheets

U.S. PATENT DOCUMENTS

| | | | |
|---|---|---|---|
| 5,848,055 A * | 12/1998 | Fedyk et al. | 370/228 |
| 6,778,524 B1 * | 8/2004 | Augart | 370/351 |
| 6,996,086 B2 | 2/2006 | Wolfe et al. | |
| 7,002,932 B1 | 2/2006 | Young et al. | |
| 2003/0235209 A1 * | 12/2003 | Garg et al. | 370/468 |
| 2004/0105407 A1 * | 6/2004 | Inoue | 370/329 |
| 2005/0066052 A1 * | 3/2005 | Gupta et al. | 709/238 |
| 2005/0153725 A1 | 6/2005 | Naghian et al. | |
| 2005/0249114 A1 * | 11/2005 | Mangin et al. | 370/229 |
| 2009/0028169 A1 | 1/2009 | Bear | |

OTHER PUBLICATIONS

Group Seminar—MULTINET Connecting to Multiple IEEE 802.11 Networks Using a single Wireless CardSeminar—Huazhi, Hong—Jan. 2005—16 pages.

Data Network Resources—Enhanced Inter-Gateway Routing Protocol (EIGRP). Extracted from: http://www.rhyshaden.com/eigrp.htm.

* cited by examiner

METHOD AND DEVICE FOR ROUTING MESH NETWORK TRAFFIC

FIELD OF THE INVENTION

The present invention relates generally to routing data in wireless networks, and in particular to routing mesh network traffic through a mesh gateway.

BACKGROUND

Mesh network technology enables wireless devices to communicate with peers by relaying network data packets through a series of wireless intermediate nodes. The intermediate nodes can be fixed elements of a network infrastructure, or mobile wireless stations that are capable of routing or relaying data packets between neighboring network nodes. A gateway that functions as a bridge between a mesh network and a non-mesh network, such as a backbone network, is called a mesh gateway or an Intelligent Access Point (IAP). A wireless intermediate node, also referred to as a wireless router or a mesh access point, can act as a router, a bridge, or a repeater to relay data packets between neighboring network nodes that are in communication with the wireless intermediate node. Thus, wireless intermediate nodes can extend a communication range of an IAP by relaying data packets between neighboring network nodes.

A mesh network can comprise one or more mesh gateways. The mesh gateways can provide wireless mesh networking by establishing wireless backhaul connections, also referred to as wireless distribution systems (WDSs). This type of mesh networking is referred to as wireless backhaul meshing or infrastructure meshing. Alternatively, a mesh network can comprise mobile wireless stations that act as intermediate nodes by relaying data between nearby mobile stations. This type of mesh networking is referred to as client meshing or ad-hoc networking. A combination of both type of mesh networking also can be used.

A large scale wireless mesh network utilizing low-powered, short-range, high-data rate communication devices can thus provide long range wireless networking. Advantages of such wireless mesh networking include low interference and large scale wireless coverage that requires significantly less infrastructure than a cellular network. For example, wireless mesh networking can provide ubiquitous Internet access if a mesh gateway participating in the mesh networking is connected the Internet.

In mesh networks that manage a large quantity of data traffic, traffic congestion can occur at a mesh gateway connected to a backbone network, such as the Internet or a public switched telephone network (PSTN), due to each node in a mesh network generally being associated with only a single mesh gateway. Thus, network traffic queued at a mesh gateway can sometimes exceed a capacity of a backhaul link of the mesh gateway, even if another mesh gateway in the same mesh network still has available capacity to route network traffic over another backhaul link.

BRIEF DESCRIPTION OF THE FIGURES

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

Figure 1:
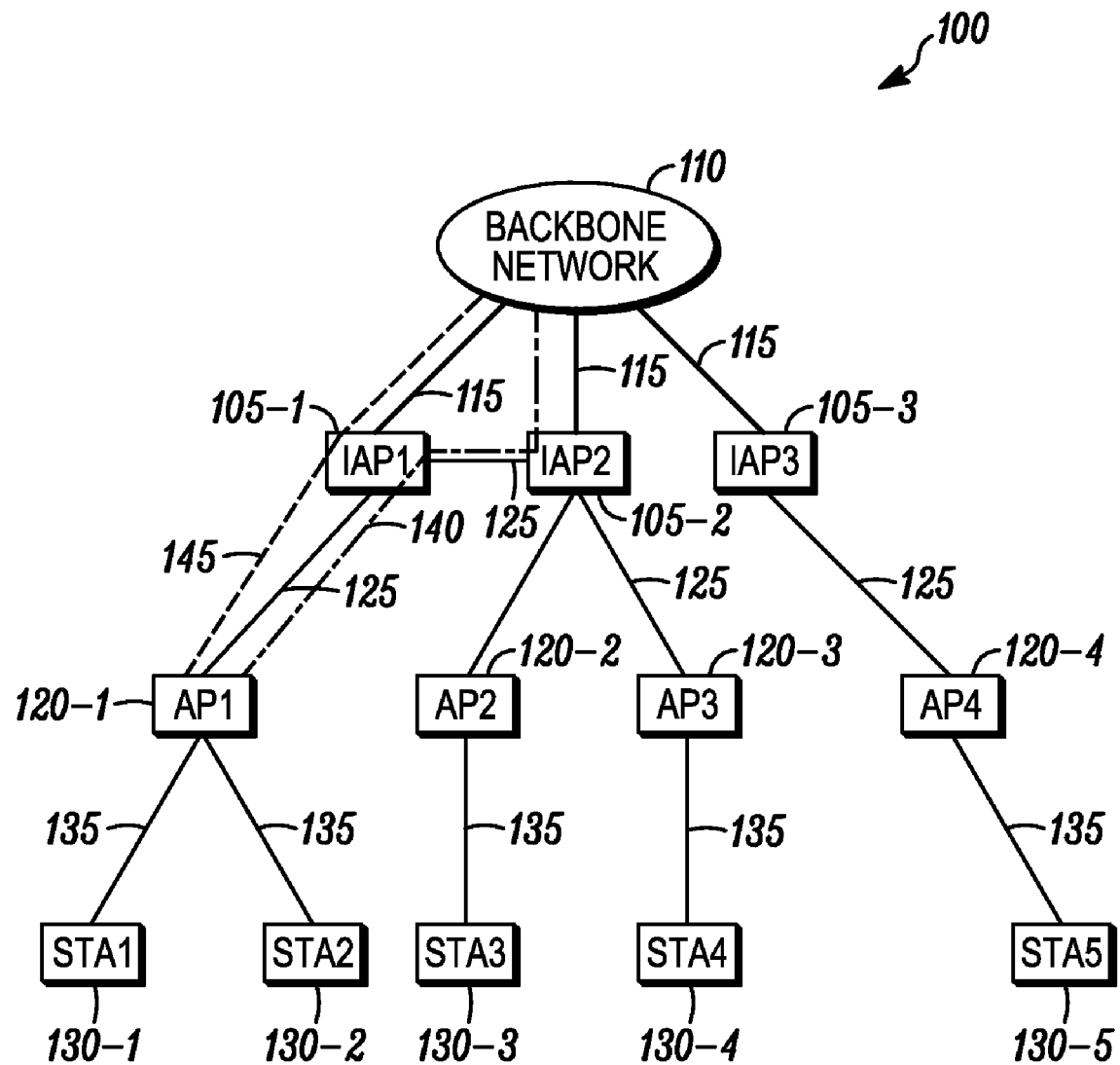
FIG. 1 is a schematic diagram illustrating a mesh network, according to some embodiments of the present invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION

Before describing in detail embodiments that are in accordance with the present invention, it should be observed that the embodiments reside primarily in combinations of method steps and apparatus components related to routing to a non-mesh network a data flow received at a mesh gateway via a wireless link. Accordingly, the apparatus components and method steps have been represented where appropriate by conventional symbols in the drawings, showing only those specific details that are pertinent to understanding the embodiments of the present invention, so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises a . . . " does not, without more constraints, preclude the existence of additional identical elements in the process, method, article, or apparatus that comprises the element.

It will be appreciated that embodiments of the invention described herein may be comprised of one or more conventional processors and unique stored program instructions that control the one or more processors to implement, in conjunction with certain non-processor circuits, some, most, or all of the functions of routing to a non-mesh network a data flow received at a mesh gateway via a wireless link as described herein. The non-processor circuits may include, but are not limited to, a radio receiver, a radio transmitter, signal drivers, clock circuits, power source circuits, and user input devices. As such, these functions may be interpreted as steps of a method for routing to a non-mesh network a data flow received at a mesh gateway. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

Any embodiment described herein is not necessarily to be construed as preferred or advantageous over other embodiments. All of the embodiments described in this Detailed Description are illustratively provided to enable persons skilled in the art to make or use the invention and not to limit the scope of the invention which is defined by the claims.

According to one aspect, some embodiments of the present invention define a method for routing to a non-mesh network a first data flow received at a first mesh gateway via a wireless link. The method includes determining that an available bandwidth of a backhaul link to the non-mesh network through the first mesh gateway is below a threshold value. It is then determined that the first data flow has a higher priority than a second data flow currently routed through the first mesh gateway to the non-mesh network. The second data flow is forwarded to a second mesh gateway in response to determining that the available bandwidth of the backhaul link is below the threshold value and determining that the first data flow has a higher priority than the second data flow, whereby the second mesh gateway routes the second data flow to the non-mesh network. The first data flow is then routed through the first mesh gateway to the non-mesh network.

Some embodiments of the present invention thus enable multiple mesh gateways to share mesh network traffic communicated between nodes in a mesh network and nodes in a non-mesh network. The sharing of mesh network traffic improves network efficiency by increasing overall data throughput between a mesh network and a non-mesh network, which data throughput could be otherwise limited to a single mesh gateway. Furthermore, routing a data flow based on an available bandwidth of a backhaul link to a non-mesh network and a priority of a data flow enables a mesh network to provide improved Quality of Service (QoS).

Data throughput between a node in a mesh network and a node outside of the mesh network is often limited by a bandwidth of a backhaul link that is associated with the node in the mesh network. Routing data through alternative backhaul links also may be possible; however, routing data packets to alternate backhaul links without considering conditions of routes and/or a priority of the data packets can introduce undesirable side effects, such as a failure to provide an adequate Quality of Service (QoS) for certain types of data packets. Therefore, some embodiments of the present invention enable a node to identify and prioritize a data flow in mesh network traffic and to determine an available bandwidth of a backhaul link. The available bandwidth and a priority are then used to select a preferred mesh gateway from a plurality of available mesh gateways. That can ensure that both traffic prioritization and load distribution are performed efficiently, and can provide a mesh network traffic distribution across a plurality of mesh gateways, without sacrificing a QoS of a data flow.

Referring to FIG. 1, a schematic diagram illustrates a mesh network 100, according to some embodiments of the present invention. The mesh network 100 comprises a plurality of Intelligent Access Point (IAP) nodes 105-n (i.e., IAP nodes 105-1 to 105-3) labeled IAP1 through IAP3 that function as mesh gateways. Each IAP node 105-n is connected to a backbone network 110 via a corresponding backhaul link 115 and connected to one or more mesh access points 120-n (i.e., mesh access points 120-1 to 120-4) via corresponding wireless links 125. Each mesh access point 120-n functions as an intermediate node routing mesh network traffic for neighboring nodes. Each mesh access point 120-n typically provides one or more sources of audio, video and/or data information. The mesh access point 120-n may be, for example, a cellular base station or other wireless access point. The backbone network 110 can be a non-mesh network, such as the Internet or a wired Local Area Network (LAN). Each mesh access point 120-n is also connected to one or more wireless nodes 130-n (i.e., wireless nodes 130-1 to 130-5, also referred to as wireless stations (STAs) or wireless devices or mesh points), via corresponding wireless links 135. The wireless nodes 130-1 to 130-5 can generally be wireless devices capable of receiving packetized audio, video and/or data information. Each wireless node 130-n can function as a producer or a consumer of mesh network traffic.

As known by those skilled in the art, each wireless node in a mesh network is normally associated with a single mesh gateway. For example, the wireless nodes 130-1 and 130-2 can be associated with the IAP1 node 105-1; the wireless nodes 130-3 and 130-4 can be associated with the IAP2 node 105-2; and the wireless node 130-5 can be associated with the IAP3 node 105-3. However, for cost and feasibility reasons, some of the backhaul links 115 may have a limited bandwidth that may be exceeded under certain network conditions. For example, when all mesh network traffic received from the wireless nodes 130-1 and 130-2 are forwarded to the IAP1 node 105-1, the aggregated mesh network traffic at the IAP1 node 105-1 can exceed a capacity of the backhaul link 115 of the IAP1 node 105-1. One method of overcoming this problem is to distribute some of the mesh network traffic to other available IAPs, such as the IAP2 node 105-2 or the IAP3 node 105-3.

However, forwarding certain types of data packets to the IAP2 node 105-2, rather than directly routing such data packets to the backbone network 110 via the backhaul link 115 of the IAP1 node 105-1, can be undesirable. For example, voice data packets are sensitive to latency, and thus re-routing voice data packets to the IAP2 node 105-2 via a first route 140 may cause unacceptable delays in delivering the packets, such as when the first route 140 requires more hops to reach the backbone network 110 than an available, and more direct, second route 145. Each additional hop can introduce an additional delay, and therefore routing certain types of data packets to an alternate mesh gateway can decrease Quality of Service (QoS) for some data packets. As described in detail below, some embodiments of the present invention enable a first mesh gateway to group data packets into data flows, and then relay some of the data flows to a second mesh gateway based on various parameters such as an available bandwidth of a backhaul link of the first mesh gateway, priorities of the data flows, and preference information of the mesh gateways.

According to some embodiments of the present invention, consider that the IAP1 node 105-1 receives mesh network traffic in the form of data packets, also referred to as data frames, from the wireless nodes 130-1 and 130-2 via the mesh access point 120-1 and the wireless link 125. The IAP1 node 105-1 can group a certain type of data packets in the mesh network traffic into a data flow. For example, a data flow can be identified by identifying data packets having the following properties: identical source addresses and identical destination addresses; identical source addresses, identical destination addresses, and identical priority values; or identical source addresses, identical destination addresses, and identical flow identities. Thus the IAP1 node 105-1 can receive a first data flow from the wireless node 130-1 and a second data flow from the wireless node 130-2 via the mesh access point 120-1 and the wireless link 125, where the first and second data flows have different source addresses. Alternatively, both the first data flow and the second data flow may be received from the same wireless node 130-1, but the data flows may be distinguished by their destinations or flow identities.

Further consider that the second data flow is currently routed through the IAP1 node 105-1 to the backbone network 110. After the first data flow is identified and a priority of the first data flow is determined, the IAP1 node 105-1 can determine whether the first data flow should be directly routed via the backhaul link 115 of the IAP1 node 105-1, or forwarded to one of the other IAP nodes 105-2, 105-3.

For example, it can be determined that an available bandwidth of the backhaul link 115 of the IAP1 node 105-1 is below a threshold value, such as a required data transmission rate of the first data flow. If the available bandwidth of the backhaul link 115 is below the threshold value, the IAP1 node 105-1 can search for a data flow that can be forwarded to one of the other IAP nodes 105-2, 105-3 in order to increase the available bandwidth of the backhaul link 115. Thus if the first data flow has a higher priority than a second data flow, the second data flow can be forwarded to one of the other IAP nodes 105-2, 105-3 to provide available bandwidth for the first data flow. For example, the second data flow can be forwarded to the IAP2 node 105-2 via the first route 140. The IAP2 node 105-2 can then route the second data flow to the backbone network 110.

According to some embodiments of the present invention, a priority of a data flow can be determined based on a priority value of data packets in a data flow. Alternatively, the priority of a data flow can be determined by types of data packets in the data flow, such as a voice type or a data type. For example, a mesh routing header of a data packet in a data flow can provide a priority value and/or a type of a data packet. A Type of Service Differentiated Services Codepoint (ToS-DSCP) value contained in a mesh routing header of a data packet can be used to indicate service parameters, a priority type, and Quality of Service for a data packet. Also, a first set of data packets in a data flow generally can be used to determine a priority of the data flow.

A priority of a data flow also can be determined by a flow type or a flow identity of the data flow. For example, a flow type of a data flow can be identified from a protocol identity (ID) field or a ToS-DSCP field in a mesh routing header of an initial data packet of the data flow. A flow type can be defined by a priority type in a ToS field, which can contain a value of "Routine", "Priority", or "Immediate". A ToS-DSCP field of a data packet in a data flow can also provide service parameters, such as a latency factor, a reliability factor, and a bandwidth factor. A flow identity of the data flow thus can be obtained, for example, from a mesh routing header of a data packet in the data flow.

According to some embodiments of the present invention, determining that a first data flow has a higher priority than a second data flow is determined by one or more of a reliability, bandwidth, or latency of a backhaul link of a mesh gateway to a non-mesh network. For example, a reliability, bandwidth, or latency of the backhaul link 115 of the IAP1 node 105-1 can be used to determine that a first data flow has a higher priority to use the backhaul link 115 than a second data flow that is currently routed to the backbone network 110 through the IAP1 node 105-1.

Also, according to some embodiments of the present invention, a mesh gateway can maintain routes to a plurality of mesh gateways. For example, the IAP1 node 105-1 can receive HELLO messages sent from the IAP nodes 105-2, 105-3. Information contained in the HELLO messages then can be used to maintain routes to the IAP nodes 105-2, 105-3.

Further, a preferred mesh gateway can be selected from a plurality of mesh gateways based on preference information about mesh gateways in the plurality of mesh gateways. For example, the IAP1 node 105-1 can obtain preference information about the IAP nodes 105-2, 105-3 via HELLO messages sent from the IAP nodes 105-2, 105-3. The HELLO messages can comprise one or more of a latency factor weight value, a reliability factor weight value, and a bandwidth factor weight value for a flow type.

According to some embodiments of the present invention, a preferred mesh gateway can be selected from a plurality of mesh gateways based on route path metrics of route paths to a non-mesh network via the plurality of mesh gateways. For example, the IAP1 node 105-1 can generate route path metrics to the backbone network 110 via the IAP nodes 105-2, 105-3 based on the priority of a first data flow and/or preference information of the IAP nodes 105-2, 105-3.

The priority of a first data flow can specify a flow type and service parameters, such as a latency factor, a reliability factor, and a bandwidth factor. For example, consider that a priority type of a data flow is identified from a ToS-DSCP field of a mesh routing header of a data packet, and the priority type is associated with a flow type identity, 'id', that defines a flow type. A route path metric of an IAP node 105-n then can be obtained for the flow type according to the following equation:

$$\text{MetricValue}_n = \text{RouteMetric}_n \times (w_{id,l} \times f_l + w_{id,r} \times f_r + w_{id,b} \times f_b) \quad \text{(Eq. 1)}$$

where MetricValue$_n$ is the route path metric of a route path to an IAP node 105-n for the flow type of the data flow, RouteMetric$_n$ is a routing metric of the route path, $f_l$ is a latency factor of the flow type, $f_r$ is a reliability factor of the flow type, $f_b$ is a bandwidth factor of the flow type, and $w_{id,l}$, $w_{id,r}$, and $w_{id,b}$ are a latency factor weight value, a reliability factor weight value, and a bandwidth factor weight value, respectively, for the flow type.

Figure 2:
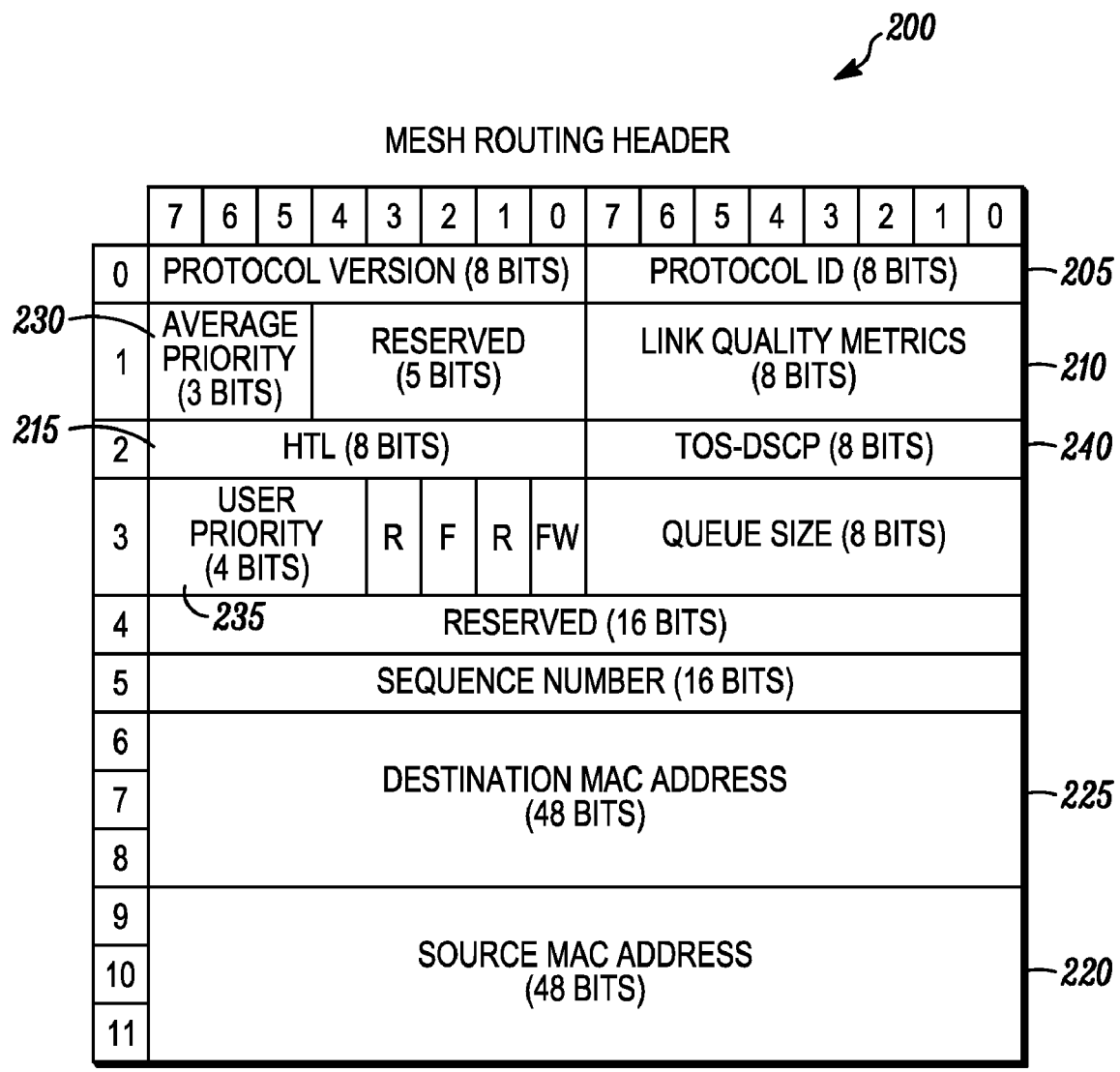
FIG. 2 is a block diagram illustrating a mesh routing header of a data packet, according to some embodiments of the present invention.

Referring to FIG. 2, a block diagram illustrates a mesh routing header 200 of a data packet, according to some embodiments of the present invention. The mesh routing header 200 comprises a plurality of fields including the following: a protocol ID field 205 that indicates a type of data present in the data packet; a link quality metrics field 210 that indicates a link quality from a perspective of a sending node of the data packet; a hop-to-live (HTL) counter field 215 that identifies a number of further hops the data packet can travel; a source address field 220 that identifies an address of a source node from which the data packet is originated; a destination address field 225 that identifies an address of a destination address to which the data packet needs to be routed; and priority fields, such as an average priority field 230, a user priority field 235, and a Type of Service Differentiated Services Codepoint (ToS-DSCP) field 240. The average priority field can be used to indicate an average priority level of data packets in a routing queue managed by a receiving node, such as the IAP nodes 105-n in the mesh network 100.

Contents of the mesh routing header 200 can be used for routing and traffic prioritization. For example, a route of a data packet can be defined by a pair (source address, destination address), a first type of a 3-tuple (source address, destination address, priority), or a second type of a 3-tuple (source address, destination address, flow identity). Thus, a data flow can have an associated route, as the data flow can comprise data packets having, for example, identical source addresses, destination addresses, and priority values, which can be used to define the associated route. Mesh gateways, such as the IAP1 node 105-1, also can use priority fields, such as the ToS-DSCP field 240, to determine a priority of a data flow.

Figure 3:
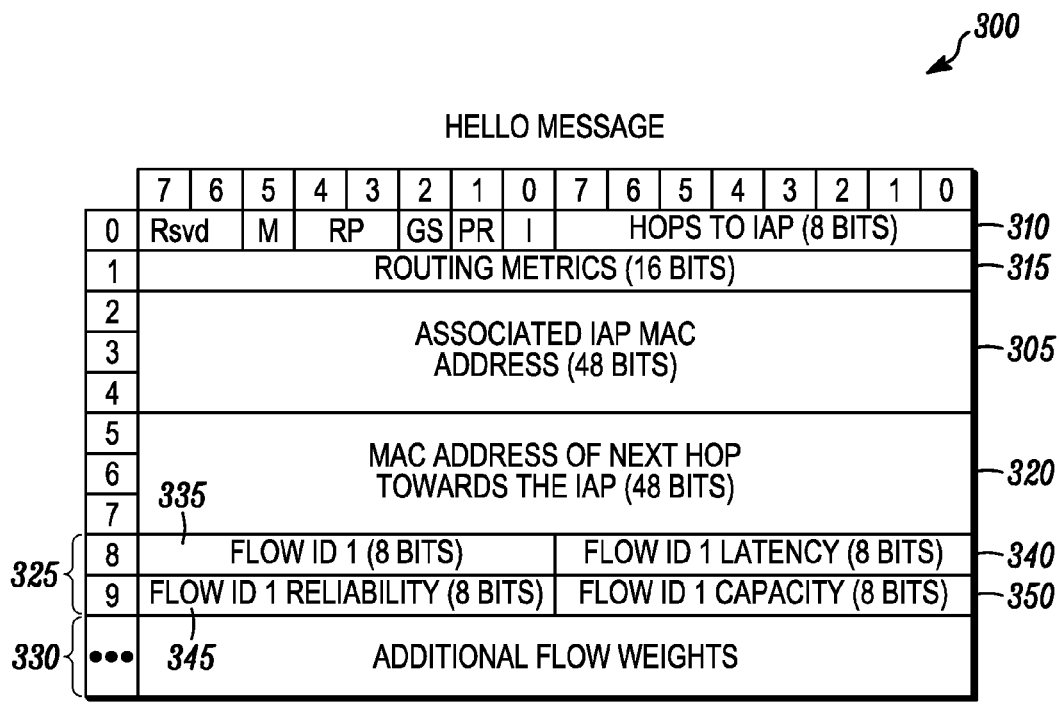
FIG. 3 is a block diagram illustrating a HELLO message, according to some embodiments of the present invention.

Referring to FIG. 3, a block diagram illustrates a HELLO message 300, according to some embodiments of the present invention. The HELLO message 300 comprises a plurality of fields including the following: an associated IAP Media Access Control (MAC) address field 305 that identifies an IAP, with which a sending node of the HELLO message 300 is associated; a hops-to-IAP field 310 that identifies a number of hops to the associated IAP from a sending node; a routing metrics field 315 that identifies routing metrics to the associated IAP; a next-hop MAC address field 320 that identifies a MAC address of a next hop towards the IAP from the sending node; and one or more flow weight sections 325, 330.

The flow weight sections 325, 330 can provide preference information of the associated IAP and/or a route to the associated IAP for various flow types. For example, the flow weight section 325 can comprise a plurality of fields including the following: a flow type ID field 335 that identifies a flow type; a flow ID latency field 340, a flow ID reliability field 345, and a flow ID capacity field 350 that identifies a latency degree, a reliability, and a bandwidth of a backhaul link of the associated IAP, or a route to the associated IAP, respectively. Also, a lack of a flow weight section 325, 330 for a flow type can be used to indicate that the associated IAP or a route to the associated IAP does not support the flow type. For example, advertising only voice flows can indicate that an IAP can backhaul only voice traffic.

Figure 4:
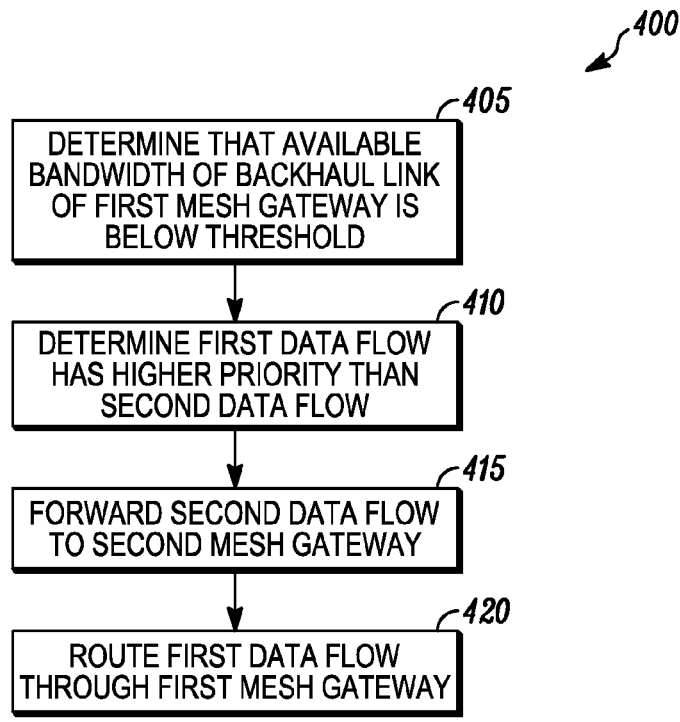
FIG. 4 is a general flow diagram illustrating a method for routing to a non-mesh network a first data flow received at a first mesh gateway via a wireless link, according to some embodiments of the present invention.

Referring to FIG. 4, a general flow diagram illustrates a method 400 for routing to a non-mesh network a first data flow received at a first mesh gateway via a wireless link, according to some embodiments of the present invention. At step 405, it is determined that an available bandwidth of a backhaul link to the non-mesh network through the first mesh gateway is below a threshold value. For example, the IAP1 node 105-1 can determine that an available bandwidth of the backhaul link 115 of the IAP1 node 105-1 is below a threshold value such that routing a first data flow through the backhaul link 115 could exceed a capacity of the backhaul link 115, where the first data flow is a new data flow received via the wireless link 125 of the IAP1 node 105-1.

At step 410, the first data flow is determined to have a higher priority than a second data flow currently routed through the first mesh gateway to the non-mesh network. For example, the IAP1 node 105-1 can determine that a first data flow received from the wireless node 130-1 via the wireless link 125 has a higher priority than a second data flow that is received from the wireless node 130-2 and currently routed through the IAP1 node 105-1 to the backbone network 110. The second data flow may be a data flow having a lowest priority among data flows that are currently directly routed through the IAP1 node 105-1 to the backbone network 110.

At step 415, the second data flow is forwarded to a second mesh gateway in response to determining that the available bandwidth of the backhaul link is below the threshold value and determining that the first data flow has a higher priority than the second data flow, whereby the second mesh gateway routes the second data flow to the non-mesh network. For example, the IAP1 node 105-1 can selected the IAP2 node 105-2 as a preferred mesh gateway for the second data flow and forward the second data flow to the IAP2 node 105-2 via the first route 140. Such forwarding is in response to determining that an available bandwidth of the backhaul link 115 of the IAP1 node 105-1 is below a threshold value and determining that the first data flow has a higher priority than the second data flow that is currently routed through the backhaul link 115 of the IAP1 node 105-1. The IAP2 node 105-2 then can route the second data flow to the backbone network 110.

At step 420, the first data flow is routed through the first mesh gateway to the non-mesh gateway. For example, a first data flow from the mesh access point 120-1 can be routed via the second route 145 through the IAP1 node 105-1 to the backbone network 110.

Figure 5:
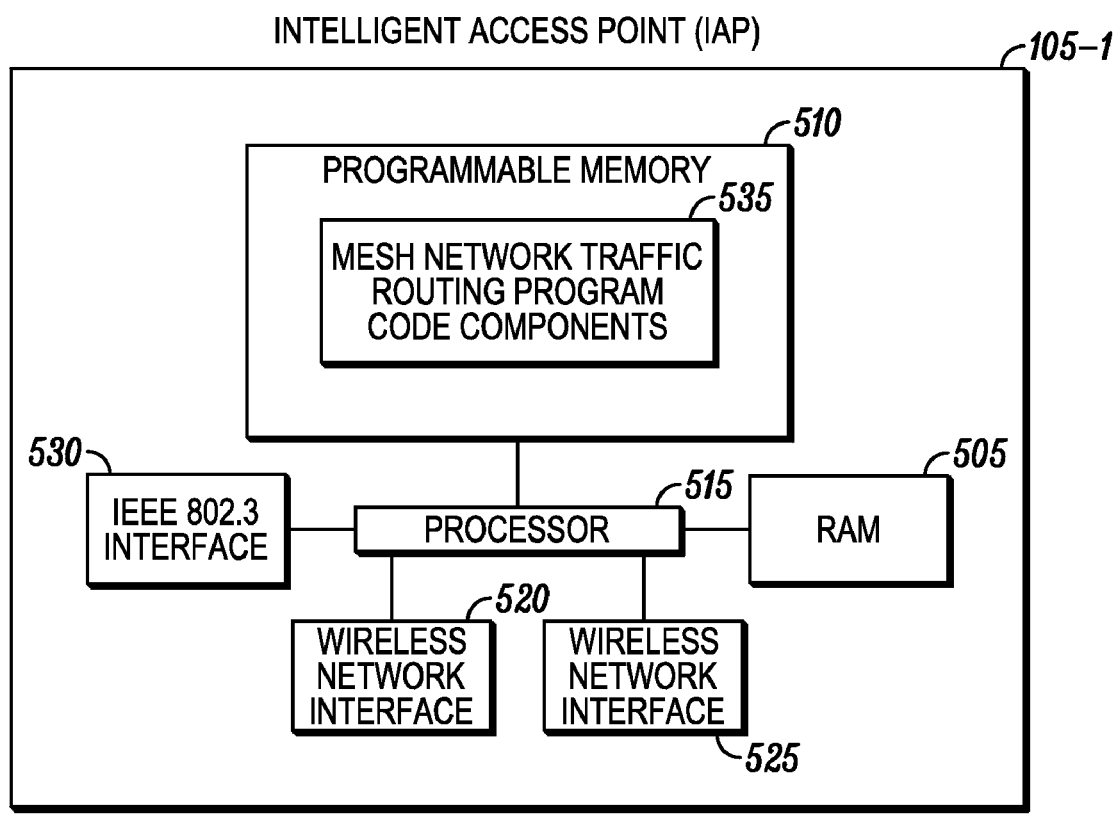
FIG. 5 is a block diagram illustrating components of an Intelligent Access Point, according to some embodiments of the present invention.

Referring to FIG. 5, a block diagram illustrates components of the Intelligent Access Point (IAP) node 105-1, according to some embodiments of the present invention. The IAP1 node 105-1 comprises a random access memory (RAM) 505 and a programmable memory 510 that are coupled to a processor 515. The processor 515 also has ports for coupling to wireless network interfaces 520, 525 and a Local Area Network (LAN) interface 530, such as an Institute of Electrical and Electronics Engineers (IEEE) 802.3 interface.

The wireless network interfaces 520, 525 can be used to enable the IAP1 node 105-1 to communicate with neighboring network nodes in the mesh network 100. For example, the IAP1 node 105-1 can use the wireless network interface 520 to communicate with the mesh access point 120-1 to receive and send data packets. The backhaul link 115 to the backbone network 110 then can be provided by either the LAN interface 530 or the wireless network interface 525.

The programmable memory 510 can store operating code (OC) for the processor 515 and code for performing functions associated with a mesh gateway. For example, the programmable memory 510 can comprise mesh network traffic routing services computer readable program code components 535 configured to cause execution of the method 400 for routing to a non-mesh network a first data flow received at a first mesh gateway via a wireless link as described herein.

Advantages of the present invention thus include enabling a mesh gateway to forward selected mesh network traffic to one or more mesh gateways based on information such as available bandwidth, priorities of data flows, and preference information concerning the mesh gateways. A mesh network therefore can be enabled to distribute mesh network traffic across a plurality of mesh gateways, which can improve network efficiency by increasing overall data throughput between nodes in the mesh network and nodes outside of the mesh network.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of the present invention. The benefits, advantages, solutions to problems, and any element(s) that may cause any benefit, advantage, or solution to occur or become more pronounced are not to be construed as critical, required, or essential features or elements of any or all the claims. The invention is defined solely by the appended claims including any amendments made during the pendency of this application and all equivalents of those claims as issued.

We claim:

1. A method for routing to a non-mesh network a first data flow received at a first mesh gateway via a wireless link, the method comprising:
   determining that an available bandwidth of a backhaul link to the non-mesh network through the first mesh gateway is below a threshold value;
   determining that the first data flow from a wireless node has a higher priority than a second data flow from the wireless node currently routed through the first mesh gateway to the non-mesh network;

forwarding the second data flow to a second mesh gateway in response to determining that the available bandwidth of the backhaul link is below the threshold value and determining that the first data flow has a higher priority than the second data flow, wherein the second mesh gateway is selected from a plurality of mesh gateways based on preference information of mesh gateways in the plurality of mesh gateways, wherein the preference information comprises one or more of a latency factor weight value, a reliability factor weight value, and a bandwidth factor weight value of a flow type, whereby the second mesh gateway routes the second data flow to the non-mesh network; and routing the first data flow to the non-mesh network through the first mesh gateway after forwarding the second data flow to the second mesh gateway.

2. The method of claim 1, wherein the priority of the first data flow is determined by priority values of data packets in the first data flow.

3. The method of claim 1, wherein the priority of the first data flow is determined by types of data packets in the first data flow.

4. The method of claim 1, wherein the priority of the first data flow is determined by a flow type or a flow identity of the first data flow.

5. The method of claim 1, wherein determining that the first data flow has a higher priority than the second data flow uses one or more of a reliability, bandwidth, or latency of the backhaul link to the non-mesh network through the first mesh gateway.

6. The method of claim 1, wherein the first data flow is identified by identifying data packets having identical source addresses and identical destination addresses.

7. The method of claim 1, wherein the first data flow is identified by identifying data packets having identical source addresses, identical destination addresses, and identical priority values.

8. The method of claim 1, wherein the first data flow is identified by identifying data packets having identical source addresses and identical flow identities.

9. The method of claim 1, wherein the first mesh gateway maintains routes to a plurality of mesh gateways.

10. The method of claim 1 wherein the first mesh gateway receives the preference information via HELLO messages.

11. The method of claim 1, wherein the second mesh gateway is selected from the plurality of mesh gateways based on route path metrics of route paths to the non-mesh network via the plurality of mesh gateways, where the route path metrics are calculated according to the following equation:

$$\text{MetricValue}_n = \text{RouteMetric}_n \times (w_{id,l} \times f_l + w_{id,r} \times f_r + w_{id,b} \times f_b),$$

where $\text{MetricValue}_n$ is a route path metric of a route path to an n-th mesh gateway in the plurality of mesh gateways for a flow type of the first data flow, $\text{RouteMetric}_n$ is a route metric of a route path, $f_l$ is a latency factor of the flow type, $f_r$ is a reliability factor of the flow type, $f_b$ is a bandwidth factor of the flow type, id is a flow type identity, and $w_{id,l}$, $w_{id,r}$, and $w_{id,b}$ are a latency factor weight value, a reliability factor weight value, and a bandwidth factor weight value, respectively, for the flow type.

12. The method of claim 1, wherein the threshold value is a data transmission rate of the first data flow.

13. The method of claim 1, wherein the first data flow and the second data flow are received from a wireless node for which the first mesh gateway is a designated mesh gateway.

14. The method of claim 1, wherein the first data flow and the second data flow are received from different wireless nodes.

15. A first mesh gateway for routing to a non-mesh network a first data flow received via a wireless link, comprising:
means for determining that an available bandwidth of a backhaul link to the non-mesh network through the first mesh gateway is below a threshold value;
means for determining that the first data flow from a wireless node has a higher priority than a second data flow from the wireless node currently routed through the first mesh gateway to the non-mesh network;
means for selecting a second mesh from a plurality of mesh gateways based on preference information of mesh gateways in the plurality of mesh gateways, wherein the preference information comprises one or more of a latency factor weight value, a reliability factor weight value, and a bandwidth factor weight value for a flow type;
means for forwarding the second data flow to a second mesh gateway in response to determining that the available bandwidth of the backhaul link is below the threshold value and determining that the first data flow has a higher priority than the second data flow, whereby the second mesh gateway routes the second data flow to the non-mesh network; and
means for routing the first data flow to the non-mesh network through the first mesh gateway after forwarding the second data flow to the second mesh gateway.

* * * * *